(12) United States Patent
Nomura et al.

(10) Patent No.: US 8,556,021 B2
(45) Date of Patent: Oct. 15, 2013

(54) HYBRID VEHICLE

(75) Inventors: Akifumi Nomura, Wako (JP);
Kazuyuki Nakai, Wako (JP); Kenichi Ohmori, Wako (JP); Yoshiaki Tsukada, Wako (JP); Takashi Tsutsumizaki, Wako (JP); Shinichi Wagatsuma, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 521 days.

(21) Appl. No.: 12/729,348

(22) Filed: Mar. 23, 2010

(65) Prior Publication Data

US 2010/0236856 A1 Sep. 23, 2010

(30) Foreign Application Priority Data

Mar. 31, 2009 (JP) ................................. 2009-087779
Feb. 3, 2010 (JP) ................................. 2010-022234

(51) Int. Cl.
*B60K 1/00* (2006.01)
(52) U.S. Cl.
USPC .......... 180/292; 180/219; 180/65.21
(58) Field of Classification Search
USPC ......... 180/220, 65.26, 219, 291, 292, 65.235, 180/165, 65.21; 123/336, 399, 192.2
See application file for complete search history.

(56) References Cited

U.S. PATENT DOCUMENTS

| | | | |
|---|---|---|---|
| 4,204,585 A * | 5/1980 | Tsuboi et al. | 180/219 |
| 5,826,671 A * | 10/1998 | Nakae et al. | 180/65.235 |
| 5,847,470 A * | 12/1998 | Mitchell | 180/65.23 |
| 6,306,057 B1 * | 10/2001 | Morisawa et al. | 475/5 |
| 6,425,838 B1 * | 7/2002 | Matsubara et al. | 475/5 |
| 7,252,020 B2 * | 8/2007 | Gray et al. | 74/732.1 |
| 7,543,668 B1 * | 6/2009 | Schechter | 180/165 |
| 7,640,744 B2 * | 1/2010 | Rollinger et al. | 60/605.1 |
| 7,789,181 B1 * | 9/2010 | Schechter | 180/165 |
| 7,819,211 B2 * | 10/2010 | Fukami et al. | 180/65.26 |
| 7,874,279 B2 * | 1/2011 | Fukami et al. | 123/399 |
| 7,909,008 B2 * | 3/2011 | Inoue et al. | 123/90.17 |
| 8,051,832 B2 * | 11/2011 | Hotta et al. | 123/399 |
| 8,113,168 B2 * | 2/2012 | Yamada | 123/336 |
| 8,160,790 B2 * | 4/2012 | Oshima et al. | 701/62 |
| 2007/0256873 A1 * | 11/2007 | Masuda et al. | 180/220 |
| 2008/0076030 A1 * | 3/2008 | Inagaki et al. | 429/330 |
| 2008/0314687 A1 * | 12/2008 | Shiozaki et al. | 123/192.2 |

FOREIGN PATENT DOCUMENTS

| | | |
|---|---|---|
| EP | 1839925 A2 | 10/2007 |
| JP | 2006-044495 | 2/2006 |
| WO | WO 2006/120835 A1 | 11/2006 |

\* cited by examiner

*Primary Examiner* — Hau Phan
(74) *Attorney, Agent, or Firm* — Birch, Stewart, Kolasch & Birch, LLP

(57) ABSTRACT

A hybrid vehicle in which an electric motor is disposed in the vicinity of a center of a vehicle body to reduce lateral expansion. The hybrid vehicle includes an engine, a motor, and a power transmission mechanism for transmitting power of the engine and the motor to a rear wheel. The engine is suspended on the vehicle body in a non-swingable manner with a cylinder extending in a substantially horizontal direction and a crankshaft provided to be oriented in a vehicle width direction. The electric motor is located in front of and above the crankshaft of the engine.

20 Claims, 14 Drawing Sheets

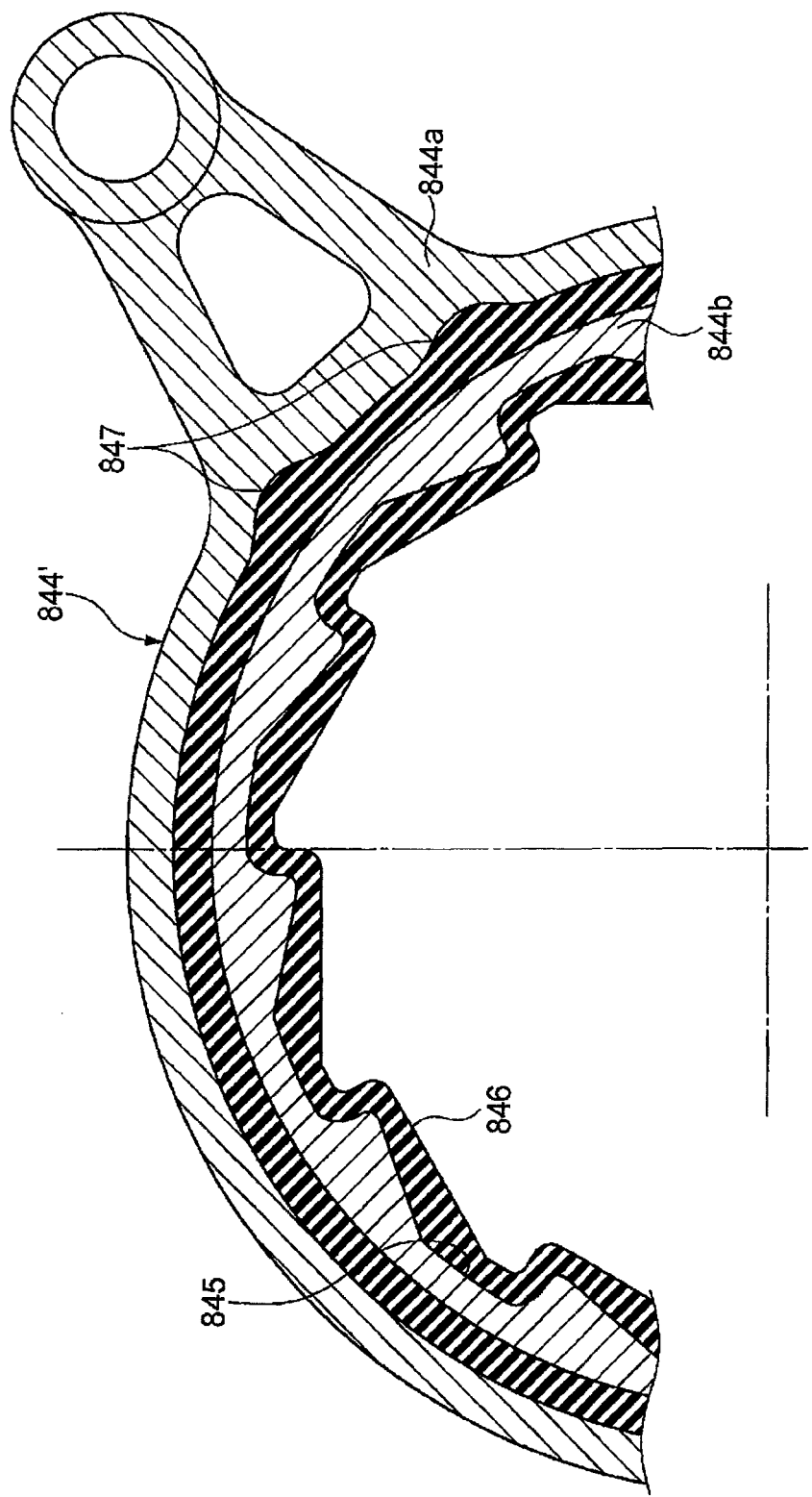

HYBRID VEHICLE

CROSS-REFERENCE TO RELATED APPLICATIONS

The present application claims priority under 35 USC 119 to Japanese Patent Application No. 2009-087779 filed on Mar. 31, 2009 and Japanese Patent Application No. 2010-022234 filed on Feb. 3, 2010 the entire contents of which are hereby incorporated by reference.

BACKGROUND OF THE INVENTION

1. Field of the Invention

The present invention relates to a hybrid vehicle having two drive sources, i.e., an internal combustion engine and an electric motor.

2. Description of Background Art

A power unit for a hybrid vehicle to be installed in a motorcycle is known as disclosed in JP-A No. 2006-044495.

According to the power unit for a hybrid vehicle as disclosed in JP-A No. 2006-044495, power from an internal combustion engine is transmitted to a rear wheel through a belt continuously variable transmission and a gear transmission constituting a power transmission mechanism. In addition, power from an electric motor is transmitted to the rear wheel through the gear transmission. The electric motor is disposed coaxially with a driven pulley constituting the continuously variable transmission, and is located lateral to the rear wheel.

However, according to this power unit, the electric motor is located rearwardly of and below a crankshaft of the internal combustion engine, and outwardly in the width direction of the driven pulley constituting the continuously variable transmission. The electric motor, disposed lateral to the rear wheel, has led to an increased lateral expansion. Also, the electric motor is heavy, and therefore, is preferably disposed in the vicinity of the center of a vehicle body.

SUMMARY AND OBJECTS OF THE INVENTION

Accordingly, an object of an embodiment of the present invention is to provide a hybrid vehicle in which an electric motor is disposed in the vicinity of the center of a vehicle body to reduce lateral expansion.

In order to accomplish the above-mentioned object, according to an embodiment of the present invention, a hybrid vehicle includes an internal combustion engine, an electric motor and a power transmission mechanism for transmitting power of the internal combustion engine and the electric motor to a driven portion. The internal combustion engine is suspended on a vehicle body in a non-swingable manner, with a cylinder extending in a substantially horizontal direction and a crankshaft provided to be oriented in a vehicle width direction. The electric motor is located in front of and above the crankshaft of the internal combustion engine.

According to an embodiment of the present invention, on one end of the crankshaft of the internal combustion engine, there is provided a variable speed mechanism for shifting power from the internal combustion engine to transmit the shifted power to the power transmission mechanism.

According to an embodiment of the present invention, the electric motor and the variable speed mechanism are provided in a one-sided manner in the vehicle width direction with respect to the internal combustion engine.

According to an embodiment of the present invention, the electric motor is disposed lateral to a cylinder block constituting the cylinder and in an overlapping manner with the cylinder block in a side view.

According to an embodiment of the present invention, the power transmission mechanism is provided with a variable speed portion for shifting power from the internal combustion engine and the electric motor to transmit the shifted power to the driven portion.

According to an embodiment of the present invention, power of the internal combustion engine is input, by the variable speed mechanism, into a primary drive gear provided on the crankshaft through a first one-way clutch to be transmitted from the primary drive gear to the power transmission mechanism.

According to an embodiment of the present invention, the primary drive gear is provided with a driven gear to engage with a motor drive gear of the electric motor, wherein power from the electric motor is input into the driven gear to be transmitted from the primary drive gear to the power transmission mechanism.

According to an embodiment of the present invention, the driven gear and a motor case overlap with each other in side view.

According to an embodiment of the present invention, a starter motor is provided for starting the internal combustion engine wherein the starter motor is disposed above the crankcase and in an overlapping manner with the electric motor in side view.

According to an embodiment of the present invention, a throttle mechanism using a throttle-by-wire system for operating the internal combustion engine is provided wherein the throttle mechanism is disposed above the cylinder and in an overlapping manner with the electric motor in a side view.

According to an embodiment of the present invention, an actuator of the throttle mechanism is located opposite to the electric motor in the width direction with respect to a vehicle center line.

According to an embodiment of the present invention, a vehicle center line is located between a center of a piston of the internal combustion engine, and the electric motor.

According to an embodiment of the present invention, a cover member for covering the electric motor is provided with a cooling opening for cooling the electric motor.

According to an embodiment of the present invention, a power unit composed of the internal combustion engine, the electric motor, and the power transmission mechanism, is suspended by a main frame extending rearward and downward from a head pipe, and an air cleaner is fixed to the main frame. The air cleaner is connected to the engine through an intake passage extending above and in front of the engine, and a leg shield is provided on either side of a head portion of the cylinder. In addition, the electric motor is disposed rearwardly of the intake passage, between the cylinder and the main frame.

According to an embodiment of the present invention, the variable speed mechanism is a double centrifugal clutch provided on the crankshaft. Also, a first-stage centrifugal clutch is configured in such a manner that, when rotational speed of a first clutch inner reaches a first predetermined rotational speed, the first clutch inner is connected to a clutch outer. The clutch outer forms a ring gear of a planetary gear mechanism provided on the crankshaft. Planetary gears engage with the ring gear engage with a sun gear rotatable in one direction and are prevented from rotating in the other direction. Connection of the first clutch inner to the clutch outer results in power transmission to the planetary gears to allow the sun gear to rotate in the other direction, so that rotation of the clutch outer is decelerated through carriers for supporting the planetary gears to be transmitted to the power transmission mechanism.

Furthermore, a second-stage centrifugal clutch is configured in such a manner that, when rotational speed of a second clutch inner rotated integrally with the carriers reaches a second predetermined rotational speed, the second clutch inner is connected to the clutch outer. Connection of the second clutch inner to the clutch outer allows the ring gear, the carriers, and the sun gear to rotate integrally in one direction, so that rotation of the clutch outer is transmitted to the power transmission mechanism, without decelerating through the planetary gear mechanism.

According to an embodiment of the present invention, the carriers are supported by an outer circumferential cylinder provided on an outer circumference of the crankshaft in such a manner so as to be rotatable relative to the crankshaft. The outer circumferential cylinder is connected to the primary drive gear through the first one-way clutch. Also, the first clutch inner and the second clutch inner are connected through a second one-way clutch. The second one-way clutch is provided to prevent the second clutch inner from rotating in one direction with respect to the first clutch inner and allow the second clutch inner to rotate in the other direction.

According to an embodiment of the present invention, the electric motor is located in front of and above the crankshaft of the internal combustion engine. This prevents the electric motor from interfering with the rear wheel, and the electric motor can be disposed in the vicinity of the center of the vehicle body, thereby allowing a reduction of lateral expansion.

According to an embodiment of the present invention, on one end of the crankshaft of the internal combustion engine, there is provided a variable speed mechanism for shifting power from the internal combustion engine to transmit the shifted power to the power transmission mechanism. Thus, power of the internal combustion engine can be previously shifted by the variable speed mechanism to be transmitted to the power transmission mechanism.

According to an embodiment of the present invention, the electric motor and the variable speed mechanism are provided in a one-sided manner in the vehicle width direction with respect to the internal combustion engine, thereby allowing effective utilization of a space lateral to the internal combustion engine.

According to an embodiment of the present invention, the electric motor is disposed laterally to the cylinder block constituting the cylinder and in an overlapping manner with the cylinder block in side view. Therefore it is possible to reduce the vertical length of the power unit and miniaturize the power unit.

According to an embodiment of the present invention, the power transmission mechanism is provided with a variable speed portion for shifting power from the internal combustion engine and the electric motor to transmit the shifted power to the driven portion. Thus, power of the internal combustion engine and the electric motor can be shifted by the variable speed portion and then transmitted to the driven portion.

According to an embodiment of the present invention, power of the internal combustion engine is input, by the variable speed mechanism, into the primary drive gear provided on the crankshaft through the first one-way clutch to be transmitted from the primary drive gear to the power transmission mechanism, thereby allowing travel of the vehicle using the power of the internal combustion engine.

According to an embodiment of the present invention, the driven gear to engage with the motor drive gear of the electric motor is provided on the primary drive gear in an integrally rotated manner with the primary drive gear, and power from the electric motor is transmitted from the primary drive gear to the power transmission mechanism, thereby allowing travel of the vehicle using the power of the electric motor. In addition, by disengaging the one-way clutch, transmission of power of the electric motor to the crankshaft is prevented. Therefore, co-rotation of the internal combustion engine during the EV running is prevented, so that fuel economy can be increased.

According to an embodiment of the present invention, the driven gear and the motor case overlap with each other in a side view. With this structure, power of the electric motor can be also decelerated by engagement between the drive gear and the driven gear of the electric motor. Also, the electric motor and the variable speed mechanism can be closely disposed.

According to an embodiment of the present invention, the starter motor is disposed above the crankcase and in an overlapping manner with the electric motor in side view, thereby allowing miniaturization of the power unit.

According to an embodiment of the present invention, the throttle mechanism is disposed above the cylinder and in an overlapping manner with the electric motor in a side view, thereby allowing miniaturization of the power unit.

According to an embodiment of the present invention, the actuator of the throttle mechanism is located opposite to the electric motor in the width direction with respect to the vehicle center line. Therefore, the expansion of the actuator allows preventing interference with the electric motor.

According to an embodiment of the present invention, the vehicle center line is located between the center of the piston of the internal combustion engine, and the electric motor. This allows a reduction of lateral expansion and an improvement of a deviation from the center of gravity of the motorcycle.

According to an embodiment of the present invention, the cover member for covering the electric motor is provided with cooling openings for cooling the electric motor, thereby suppressing heat generation of the electric motor.

According to an embodiment of the present invention, the electric motor is disposed rearwardly of the intake passage, between the cylinder and the main frame, thereby allowing miniaturization of the power unit.

According to an embodiment of the present invention, the variable speed mechanism is a double centrifugal clutch provided on the crankshaft. Also, the first-stage centrifugal clutch decelerates rotation of the clutch outer through the planetary gear mechanism to transmit the rotation to the power transmission mechanism. Furthermore, the second-stage centrifugal clutch transmits rotation of the clutch outer to the power transmission mechanism without decelerating the rotation through the planetary gear mechanism. This structure allows automatic gear shifting according to a rotational speed during operation of the engine.

According to an embodiment of the present invention, the first clutch inner and the second clutch inner are connected through the second one-way clutch. The second one-way clutch is provided to prevent the second clutch inner from rotating in one direction with respect to the first clutch inner and allow the second clutch inner to rotate in the other direction. With this structure, it is possible to reliably prevent rotational noises of the ratchets during operation of the motor. In addition, a miniaturization of energy losses caused by co-rotation of the outer circumferential cylinder with the rotation of the primary drive gear.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 14 is a sectional view of a modification of a ratchet receiving portion.

DETAILED DESCRIPTION OF THE PREFERRED EMBODIMENTS

Figure 1:
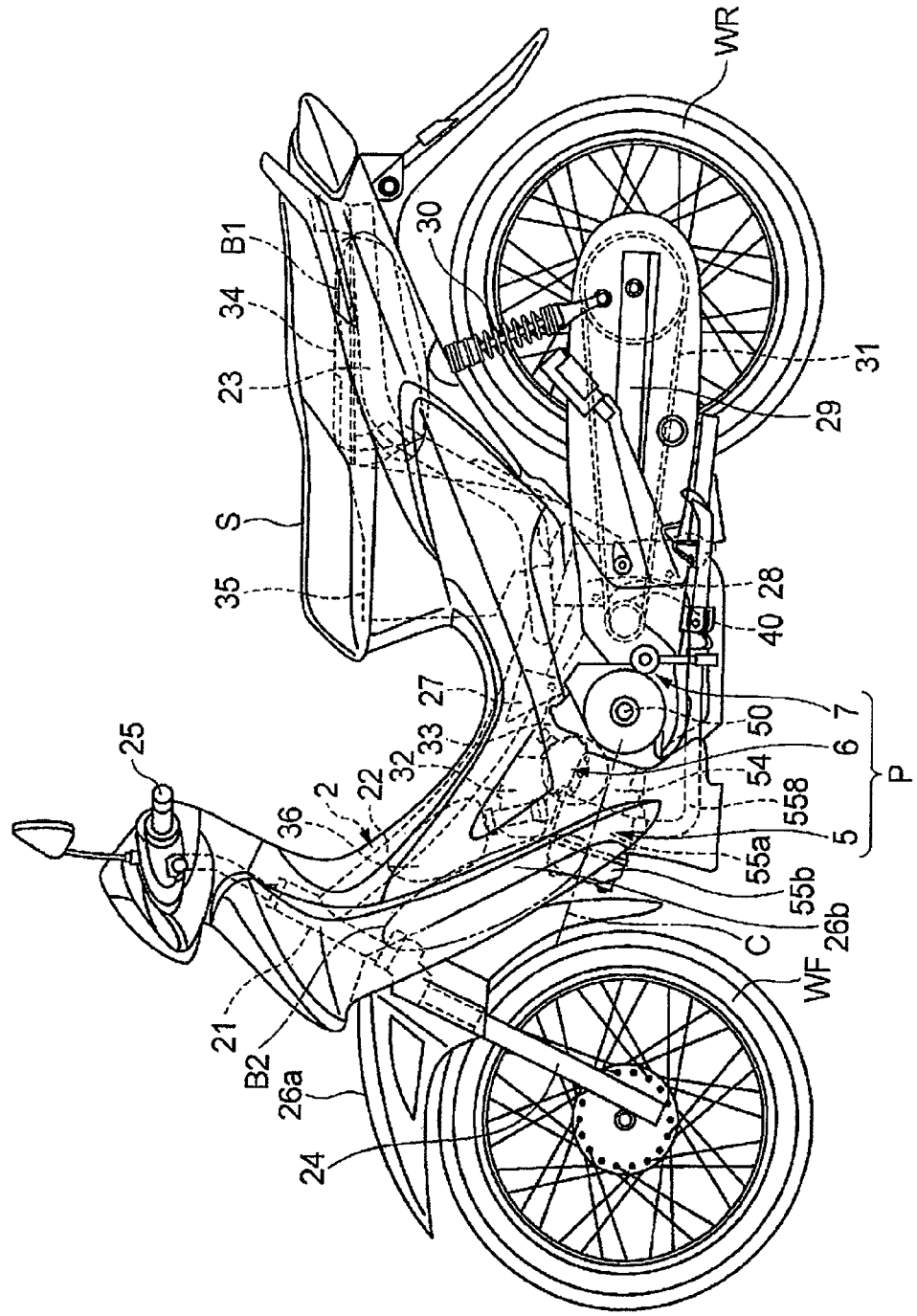
FIG. 1 is a side view of a motorcycle according to an embodiment of a hybrid vehicle of the present invention.

Hereinafter, an embodiment of a hybrid vehicle of the present invention will be described with reference to the accompanying drawings. FIG. 1 is a side view according to an embodiment of the hybrid vehicle of the present invention.

The hybrid vehicle of the present invention is a motorcycle. A body frame 2 of the motorcycle 1 includes a head pipe 21 for steerably supporting a front fork 24, a main frame 22 extending rearward and downward from the head pipe 21, and a pair of left and right rear frames 23 connected to a rear portion of the main frame 22 to extend rearward and upward. A front wheel WF is journaled to a lower end of the front fork 24, and a steering handlebar 25 in a bar shape is coupled to an upper portion of the front fork 24. A front fender 26a for covering the front wheel WF from above is supported by the front fork 24. Also, the motorcycle 1 is provided with leg shields 26b extending rearward and downward from the upper side of the front fender 26a for protecting legs of an occupant.

Below the main frame 22, there is disposed an engine (an internal combustion engine) 5 with a cylinder axis C in a substantially horizontal direction and with a crankshaft 50 (see FIG. 2) provided to be oriented in a vehicle width direction. The engine 5 is suspended by the body frame 2 in such a manner so as to be supported by hanger plates 27 and a pivot plate 28.

A front end of a rear fork 29 is supported swingably in a vertical direction on the pivot plate 28, and a rear wheel WR is journaled to a rear end of the rear fork 29. Also, a rear shock absorber 30 is provided between the rear frames 23 of the body frame 2 and the rear fork 29.

The engine 5, together with a motor (an electric motor) 6 and a power transmission mechanism 7, constitutes a power unit P to be described later. Also, output of the power transmission mechanism 7 is transmitted to the rear wheel WR serving as a driven portion through a drive chain 31.

Figure 10:
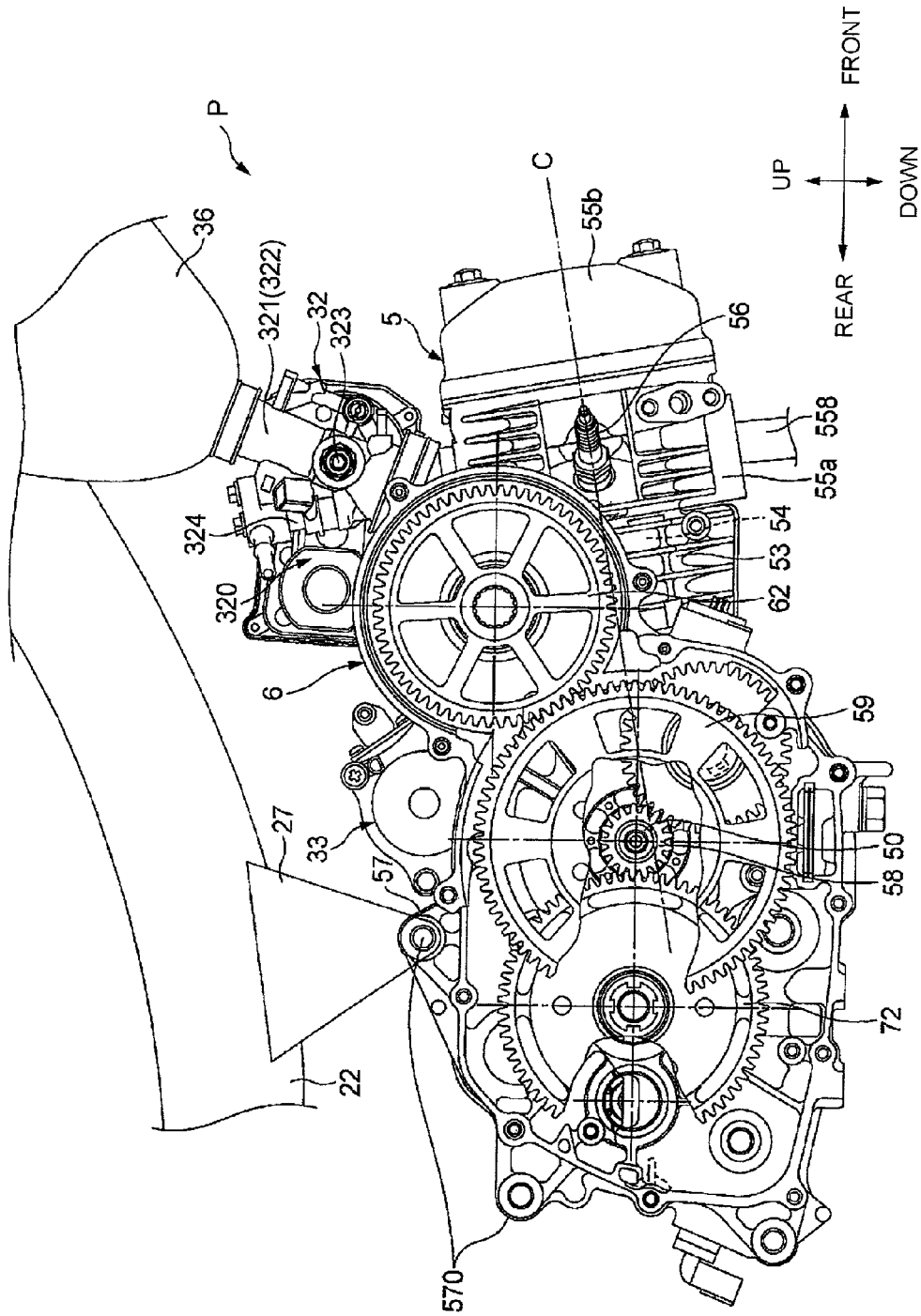
FIG. 10 is a side view with portions broken away of the power unit as seen from a side thereof.

In addition, above the engine 5, there are disposed a throttle mechanism 32, a starter motor 33, and an air cleaner 36 fixed to the main frame 22 (see also FIG. 10). Also, a fuel tank 34 is disposed above the rear wheel WR. A storage box 35, disposed in front of the fuel tank 34, and the fuel tank 34 are covered with a cover that can be opened, from above, with a riding seat S such as a tandem seat.

Figure 2:
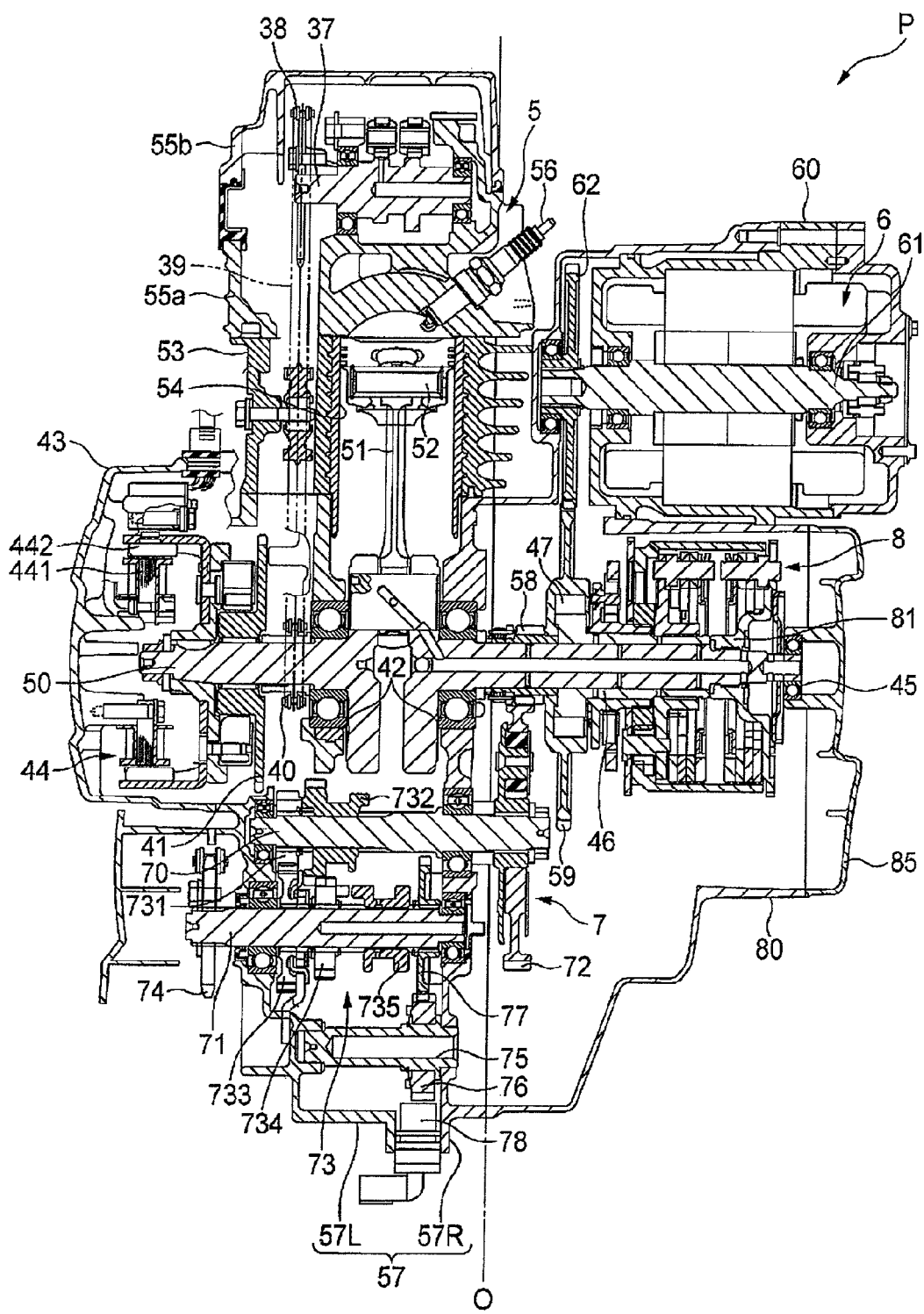
FIG. 2 is a sectional view of a power unit for the motorcycle shown in FIG. 1.
Figure 3:
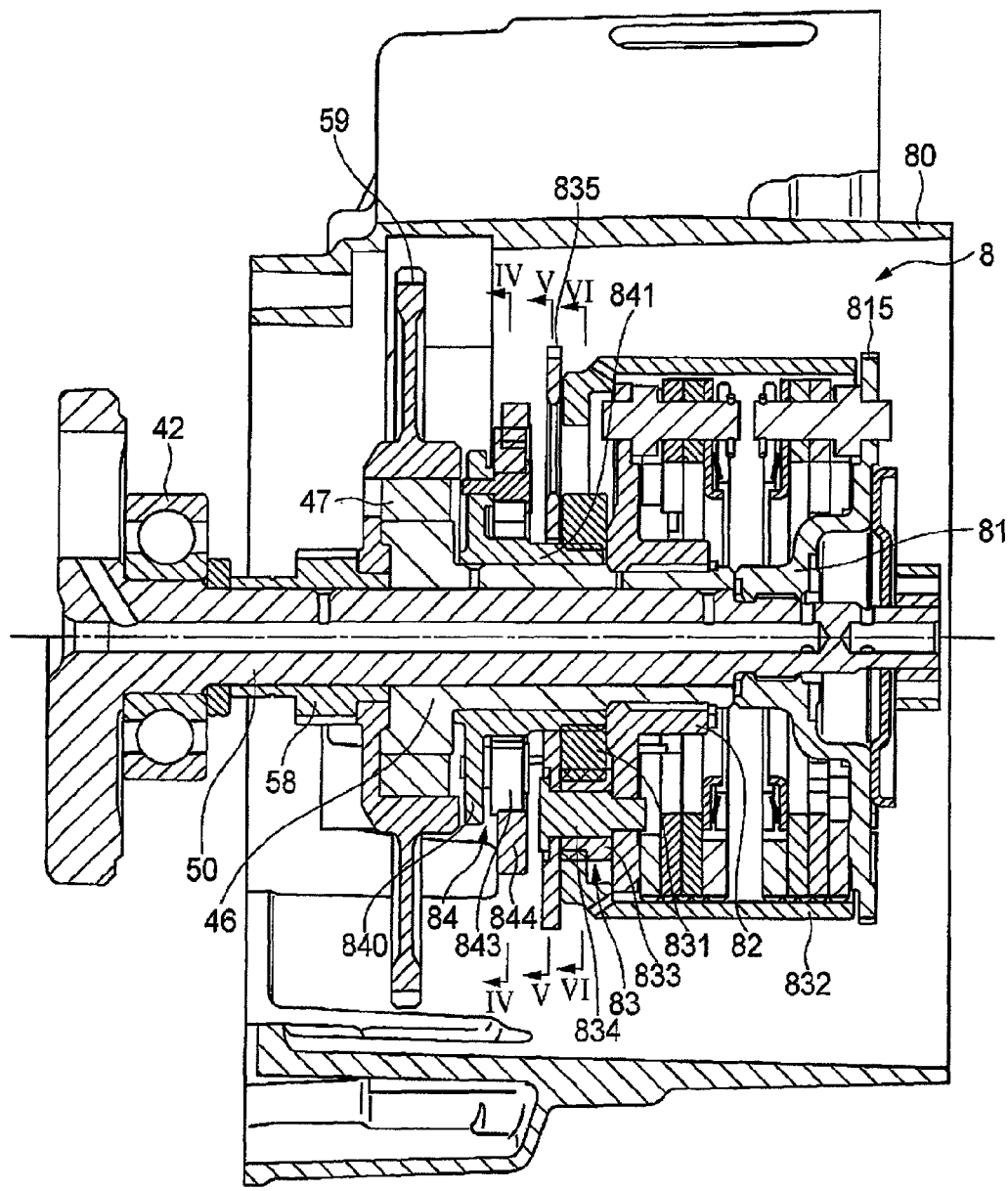
FIG. 3 is a sectional view of a variable speed mechanism of the power unit.
Figure 4:
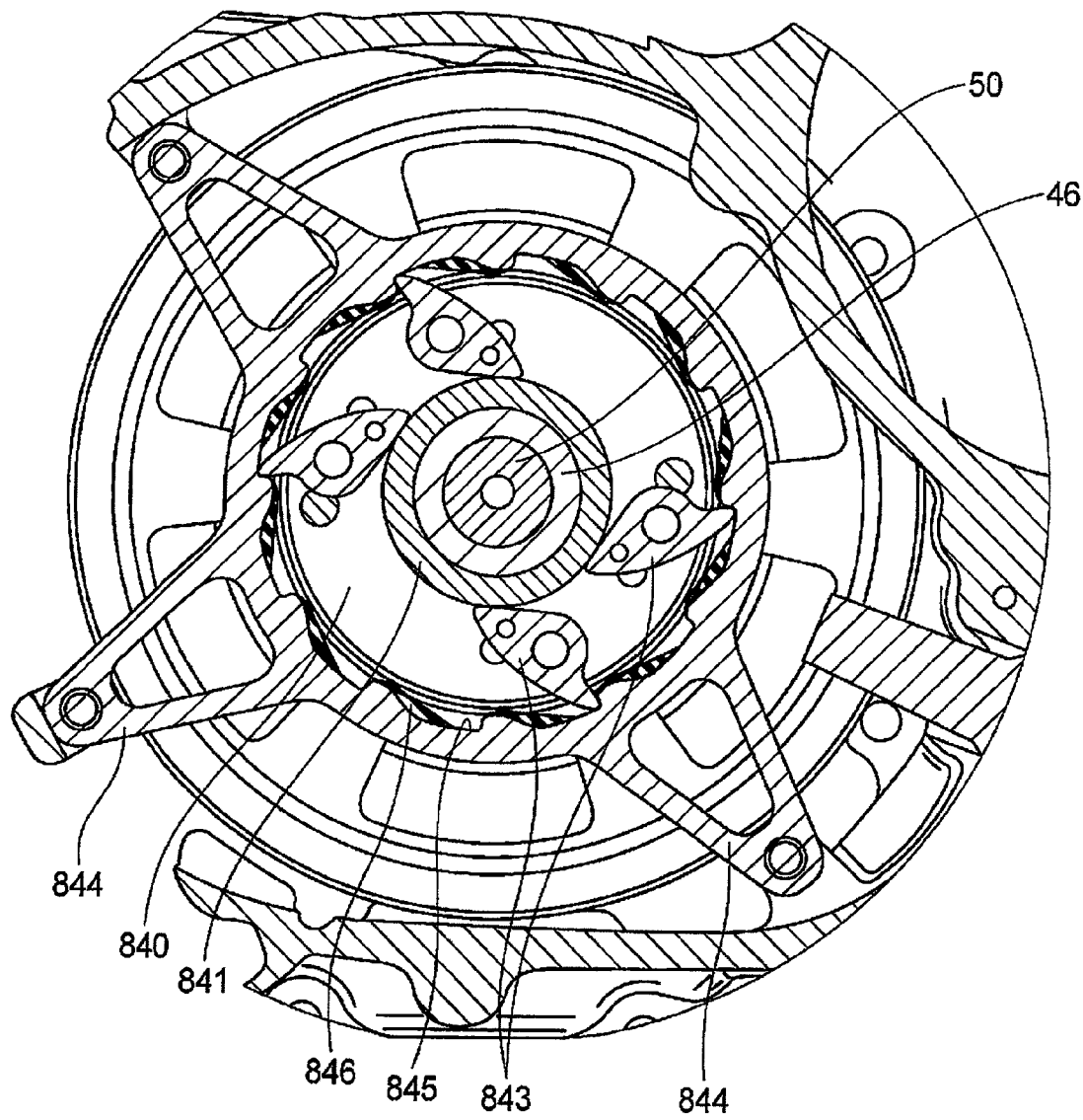
FIG. 4 is a sectional view taken along line IV-IV of FIG. 3.
Figure 5:
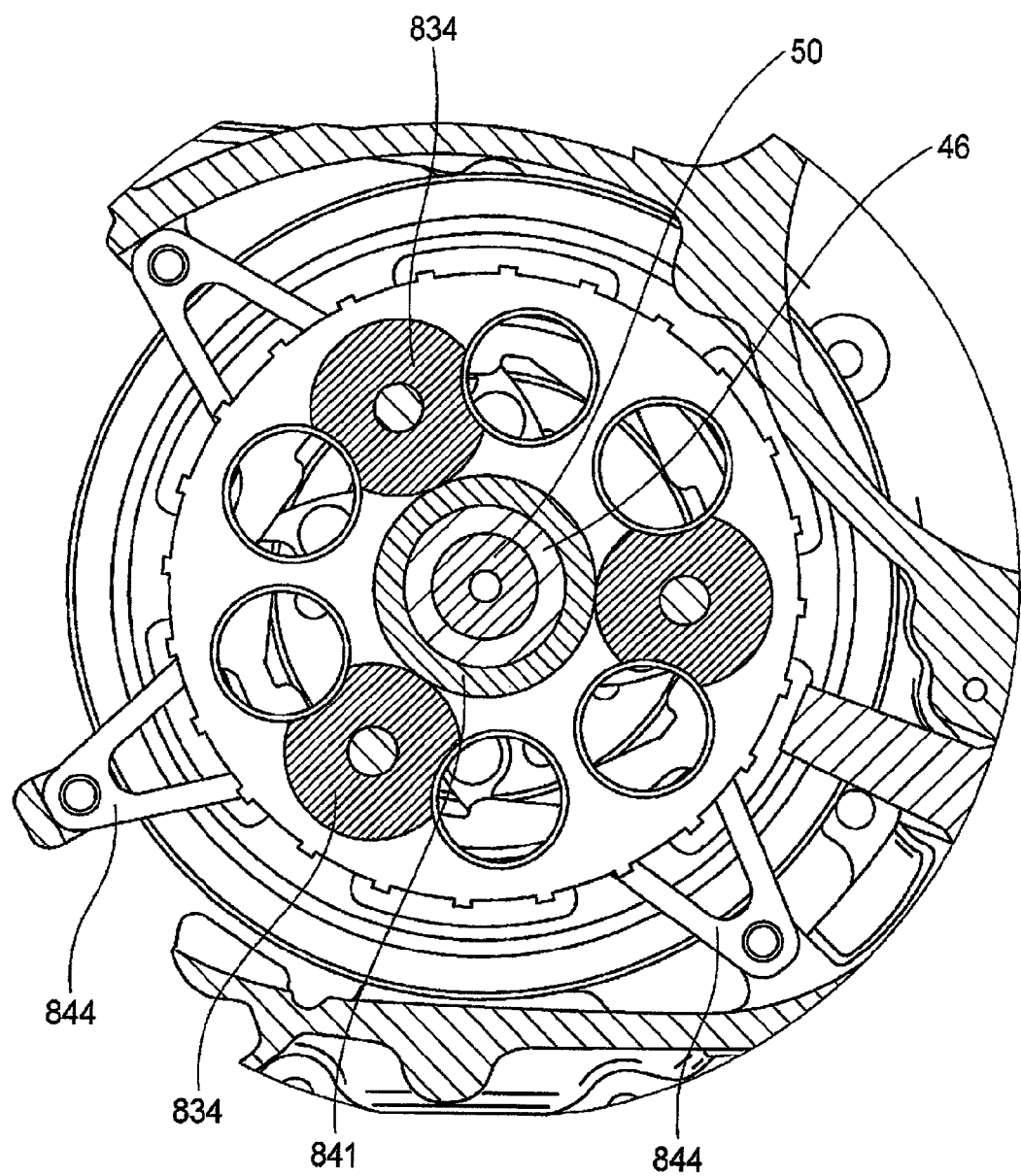
FIG. 5 is a sectional view taken along line V-V of FIG. 3.
Figure 6:
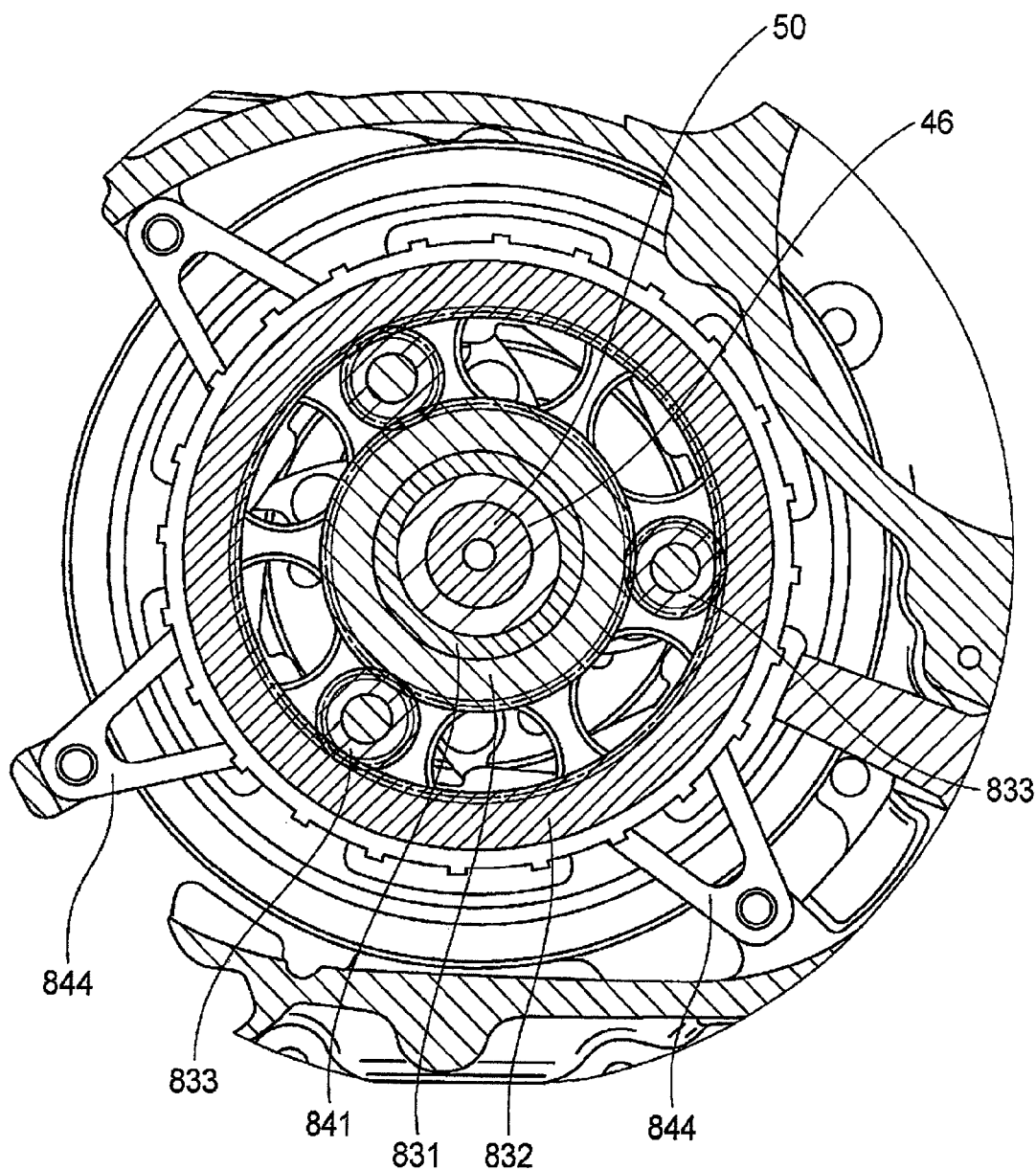
FIG. 6 is a sectional view taken along line VI-VI of FIG. 3.

Hereinafter, a power unit for the hybrid vehicle according to this embodiment will be described in detail with reference to FIGS. 2 to 11. FIG. 2 is a sectional view of the power unit for the motorcycle shown in FIG. 1, in which reference sign O denotes a vehicle center line showing the center in the width direction.

The power unit P is composed chiefly of the engine 5 and the motor 6 serving as drive sources, the power transmission mechanism 7 for transmitting power of the engine 5 and the motor 6 to the rear wheel WR, a double centrifugal clutch 8 serving as a variable speed mechanism for shifting power of the engine 5 between the engine 5 and the power transmission mechanism 7 to transmit the power to the power transmission mechanism 7, and an oil pump 9.

A battery not shown is connected to the motor 6 and the starter motor 33. When the motor 6 functions as a motor and when the starter motor 33 functions as a starter, the battery is configured to supply power to the motor 6 and the starter motor 33. Also, when the motor 6 functions as a generator, the battery is configured to be charged with regenerative electric power. The battery may be mounted, for example, in a space axially adjacent to the fuel tank 34 as shown by reference sign B1 of FIG. 1 or alternatively, may be mounted in a space within the left and right leg shields 26b as shown by reference sign B2.

A throttle valve for controlling the amount of air is turnably provided within an intake pipe of the engine 5. The throttle valve (not shown) is housed within the throttle mechanism 32 to be turned according to a manipulated variable of a throttle grip (not shown) operated by an occupant. In this embodiment, there is installed a TBW (throttle-by-wire) system for detecting an accelerator opening operated by the occupant and calculating an optimum opening of the throttle valve on the basis of the detected accelerator opening and signals from various kinds of sensors to perform opening and closing of the throttle valve not shown with an actuator 320 (see FIG. 10) on the basis of the calculated throttle opening. In FIG. 10, reference sign 321 denotes a throttle body constituting an intake passage 322 connecting the engine 5 and the air cleaner 36; 323, a throttle valve shaft; 324, an injector; 570, an engine hanger.

The engine 5 includes a piston 52 coupled to the crankshaft 50 through a connecting rod 51. The piston 52 is slidable within a cylinder 54 provided in a cylinder block 53, and the cylinder block 53 is provided in such a manner that the axis C of the cylinder 54 is substantially horizontal. A cylinder head 55a and a head cover 55b are fixed to a front surface of the cylinder block 53. Also, a combustion chamber for burning an air-fuel mixture therein is formed by the cylinder head 55a, the cylinder 54, and the piston 52. As shown in FIG. 1, the leg shield 26b is provided on either side of the head cover 55b.

In the cylinder head 55a, there are provided a valve (not shown) for controlling intake or exhaust of the air-fuel mixture into or from the combustion chamber, and a spark plug 56. The opening and closing of the valve is controlled by rotation of a camshaft 37 journaled to the cylinder head 55a. The camshaft 37 is provided with a driven sprocket 38 on one end thereof, and an endless cam chain 39 is stretched between the driven sprocket 38 and a drive sprocket 40 provided on one end of the crankshaft 50. Also, a starter driven gear 41 connected to the starter motor 33 is integrally attached, by spline-fitting, to the crankshaft 50, adjacent to the drive sprocket 40.

The crankshaft 50 is supported through respective bearings 42 by a left crankcase 57L and a right crankcase 57R (hereinafter, the combination of the left crankcase 57L and the right crankcase 57R will be referred to as a crankcase 57). A stator case 43 is coupled to the left side in the lateral direction of the crankcase 57, and an alternator 44 (an AC generator ACG) serving as an outer rotor motor is accommodated within the stator case 43. A crankcase cover 80 for containing the double centrifugal clutch 8 is coupled to the right side in the lateral direction of the crankcase 57. In addition, a clutch cover 85 for supporting the crankshaft 50 through a bearing 45 is coupled to a right-hand edge of the crankcase cover 80. A motor case 60 is coupled to a space in front of the inside of the crankcase cover 80, lateral to the cylinder block 53. The motor 6 with a motor drive gear 62 attached to a motor output shaft 61, is integrally accommodated within the motor case 60.

Furthermore, an outer rotor 442 opposed to an inner stator 441 constituting the alternator 44 is attached to a left-hand end of the crankshaft 50, and a first clutch inner 81 of the double centrifugal clutch 8 is spline-fitted in a right-hand end of the crankshaft 50. Also, on the crankshaft 50, a primary drive gear 58 and an outer circumferential shaft 46 (outer circumferential cylinder) are disposed between the connecting rod 51 and the first clutch inner 81 in such a manner as to be rotatable relative to the crankshaft 50 and to cover the outer circumference of the crankshaft 50.

The primary drive gear 58 engages with a primary driven gear 72 attached to a main shaft 70 of the power transmission mechanism 7 to be described later. Also, a driven gear 59 having a diameter larger than that of the primary drive gear 58 is attached adjacent to the primary drive gear 58 in an integrally rotatable manner.

The driven gear 59 engages with the motor drive gear 62, with an inner diameter of the driven gear 59 configured to have a right-hand opening space, and is connected to the outer circumferential shaft 46 through a one-way clutch 47 accommodated in the space. Also, the driven gear 59 and the motor case 60 are disposed in an overlapping manner in side view.

The one-way clutch 47 is engaged to transmit power from the outer circumferential shaft 46 to the driven gear 59 when the rotational speed of the outer circumferential shaft 46 is higher than that of the driven gear 59, and the one-way clutch 47 is disengaged to cut off transmission of power when the rotational speed of the driven gear 59 is higher than that of the outer circumferential shaft 46.

The double centrifugal clutch 8 is composed of, for example, as shown in FIGS. 4 to 7, the first clutch inner 81, a second clutch inner 82, a planetary gear mechanism 83, and a ratchet clutch mechanism 84. As described above, the first clutch inner 81 is spline-fitted in the crankshaft 50 to rotate integrally with the crankshaft 50. On the other hand, the second clutch inner 82 is spline-fitted in the outer circumference of the outer circumferential shaft 46 to be configured to rotate integrally with the outer circumferential shaft 46.

The planetary gear mechanism 83 is composed of a sun gear 831, a ring gear 832, planetary gears 833 to engage between the sun gear 831 and the ring gear 832, and planetary carriers 834 for supporting the planetary gears 833. The planetary carriers 834 are connected to the second clutch inner 82 to be configured to rotate integrally therewith.

The ring gear 832 functions as a clutch outer of the first clutch inner 81 and the second clutch inner 82. When the rotational speed of the first clutch inner 81 reaches a first predetermined rotational speed, a weight of the first clutch inner 81 comes into contact with an inner peripheral surface of the ring gear 832 to be brought into an engaged state. Further, when the rotational speed of the second clutch inner 82 reaches a second predetermined rotational speed higher than the first predetermined rotational speed, a weight of the second clutch inner 82 comes into contact with an inner peripheral surface of the ring gear 832 to be brought into an engaged state. The sun gear 831 is connected to the ratchet clutch mechanism 84.

The ratchet clutch mechanism 84 is composed of a ratchet supporting member 841 disposed on the outer circumference of the outer circumferential shaft 46 in a relatively rotatable manner and having a flange 840; plurality of ratchets 843 supported by the flange 840; and a ratchet receiving portion 844 extended from the crankcase cover 80. The sun gear 831 of the planetary gear mechanism 83 is spline-fitted in the outer circumference of the ratchet supporting member 841 to be configured to rotate integrally therewith. Also, when the ratchet supporting member 841 attempts to rotate counterclockwise using power from the sun gear 831, the ratchets 843 engage with grooves 845 of the ratchet receiving portion 844 extending from the crankcase cover 80 to lock the rotation of the ratchet supporting member 841. On the contrary, when the ratchet supporting member 841 attempts to rotate clockwise, on the contrary, the ratchets 843 do not engage with the grooves 845 of the ratchet receiving portion 844 to idle the ratchet supporting member 841. Also, vibration-proof rubbers 846 are attached by baking to the respective grooves 845.

In the double centrifugal clutch 8 constructed in this manner, when the rotational speed of the crankshaft 50 is lower than the first predetermined rotational speed, the first clutch inner 81 rotated integrally with the crankshaft 50 has non-contact with an inner peripheral surface of the ring gear 832 to be brought into a disengaged state, so that power of the crankshaft 50 is prevented from being transmitted to the power transmission mechanism 7.

On the other hand, when the rotational speed of the crankshaft 50 reaches the first predetermined rotational speed, the weight of the first clutch inner 81 comes into contact with an inner peripheral surface of the ring gear 832 to be brought into an engaged state. At this time, the ring gear 832 rotates clockwise, and the planetary carriers 834 also rotate clockwise through the planetary gears 833 engaging with the ring gear 832, so that a counterclockwise rotational torque acts on the sun gear 831. Also, a counterclockwise rotational torque acts on the ratchets 843 through the ratchet supporting member 841 spline-fitted in the sun gear 831 to engage the ratchets 843 with the grooves 845 of the ratchet receiving portion 844, thereby locking the sun gear 831. Therefore, power transmitted from the crankshaft 50 to the planetary carriers 834 is decelerated to be transmitted to the outer circumferential shaft 46 rotated integrally with the planetary carriers 834. When the rotational speed of the outer circumferential shaft 46 is higher than that of the driven gear 59 engaging with the motor drive gear 62, the one-way clutch 47 is engaged to transmit power of the crankshaft 50 to the primary drive gear 58 rotated integrally with the driven gear 59, and then transmit the power to the power transmission mechanism 7 through the primary driven gear 72 by engagement of the primary driven gear 72 with the primary drive gear 58.

On the other hand, when, through the drive of the motor 6, the rotational speed of the driven gear 59 is higher than that of the outer circumferential shaft 46, the one-way clutch 47 is disengaged to prevent power of the crankshaft 50 from being transmitted to the power transmission mechanism 7.

Also, when, through the engagement of the first clutch inner 81, the rotational speed of the second clutch inner 82 following the rotation of the planetary carriers 834 reaches the second predetermined rotational speed, the weight of the second clutch inner 82 comes into contact with the inner peripheral surface of the ring gear 832 to be brought into an engaged state. At this time, the ring gear 832 and the planetary carriers 834 rotate integrally through the second clutch inner 82, and are also integrated with the sun gear 831. That is to say, the planetary gear mechanism 83 is brought into an integrated state. At this time, a clockwise rotational torque acts on the ratchets 843 through the ratchet supporting member 841 spline-fitted in the sun gear 831, and the ratchets 843 do not engage with the grooves 845 of the ratchet receiving portion 844 to idle the ratchet supporting member 841. Therefore, power transmitted from the crankshaft 50 to the planetary gear mechanism 83 is transmitted, without decelerating, to the outer circumferential shaft 46 rotated integrally with the planetary carriers 834. Also, when the rotational speed of the outer circumferential shaft 46 is higher than that of the driven gear 59 engaging with the motor drive gear 62 of the motor 6, the one-way clutch 47 is engaged to transmit power of the crankshaft 50 to the primary drive gear 58 rotated integrally with the driven gear 59, and then transmit the power to the power transmission mechanism 7 through the primary driven gear 72 by engagement of the primary driven gear 72 with the primary drive gear 58.

On the other hand, when, through the drive of the motor 6, the rotational speed of the driven gear 59 is higher than that of the outer circumferential shaft 46, the one-way clutch 47 is disengaged to prevent power of the crankshaft 50 from being transmitted to the power transmission mechanism 7.

As described above, the motor 6 is constructed with the motor drive gear 62 attached to the motor output shaft 61, and the motor drive gear 62 always engages with the driven gear 59 provided around the crankshaft 50. Therefore, the power of the motor 6 is transmitted to the driven gear 59 by engagement of the motor drive gear 62 and the driven gear 59 with each other, and then, transmitted from the primary drive gear 58 rotated integrally with the driven gear 59 to the power transmission mechanism 7 through the primary driven gear 72 by engagement of the primary driven gear 72 with the primary drive gear 58. The driven gear 59 is connected to the outer circumferential shaft 46 through the one-way clutch 47. Therefore, the power of the motor 6 is transmitted to the power transmission mechanism 7 only when the rotational speed of the driven gear 59 is higher than that of the outer circumferential shaft 46. At this time, the one-way clutch 47 is disengaged to prevent the power of the motor 6 from being transmitted to the outer circumferential shaft 46. On the other hand, when the rotational speed of the outer circumferential shaft 46 is higher than that of the driven gear 59, the power of the crankshaft 50 is transmitted to the power transmission mechanism 7, so that the motor 6 follows the rotation of the crankshaft 50. At this time, according to the state of charge (SOC) of the battery, an assist by the motor 6 may be carried out or alternatively, regenerative charge may be performed. Also, the load can be reduced by zero torque control.

Next, the power transmission mechanism 7 will be described.

The power transmission mechanism 7 is provided with a variable speed portion 73 between the main shaft 70 and a countershaft 71. As described above, the primary driven gear 72 to engage with the primary drive gear 58 provided on the outer circumference of the crankshaft 50, is attached to a right-hand end of the main shaft 70. A drive sprocket 74 is attached to a left-hand end of the countershaft 71, and the power transmitted to the main shaft 70 is transmitted to the rear wheel WR through the drive chain 31 (see FIG. 1) wound around the drive sprocket 74. On a right-hand end of the countershaft 71, there is provided a vehicle-speed detecting output gear 77 to engage with a vehicle-speed detecting input gear 76 rotatably provided on a sub-shaft 75. Also, in the crankcase 57, a detector 78 for detecting speed is provided at a position opposite to the vehicle-speed detecting input gear 76.

The variable speed portion 73 is composed of a low-speed drive gear 731 provided on the outer circumference of the main shaft 70 in a relatively rotatable manner; a high-speed drive-shifter gear 732 disposed on the outer circumference of the main shaft 70 to rotate integrally with the main shaft 70, and provided slidably along an axis of the main shaft 70; a low-speed driven gear 733 spline-fitted in the outer circumference of the countershaft 71 to rotate integrally with the countershaft 71; a high-speed driven gear 734 provided on the outer circumference of the countershaft 71 in a relatively rotatable manner; and a shifter 735 disposed on the outer circumference of the countershaft 71 to rotate integrally with the countershaft 71, and provided slidably along an axis of the countershaft 71. The low-speed drive gear 731 and the low-speed driven gear 733 always engage with each other to constitute a low-speed gear pair 736. The high-speed drive-shifter gear 732 and the high-speed driven gear 734 always engage with each other to constitute a high-speed gear pair 737.

Under normal conditions, the variable speed portion 73 is set so that the vehicle travels in a drive mode using the high-speed gear pair 737. When a larger torque is required, the vehicle is allowed to travel in a low-speed mode using the low-speed gear pair 736. Therefore, an occupant swings a shift pedal (not shown), thereby shifting from neutral to the drive mode, or to the low-speed mode.

Figure 7:
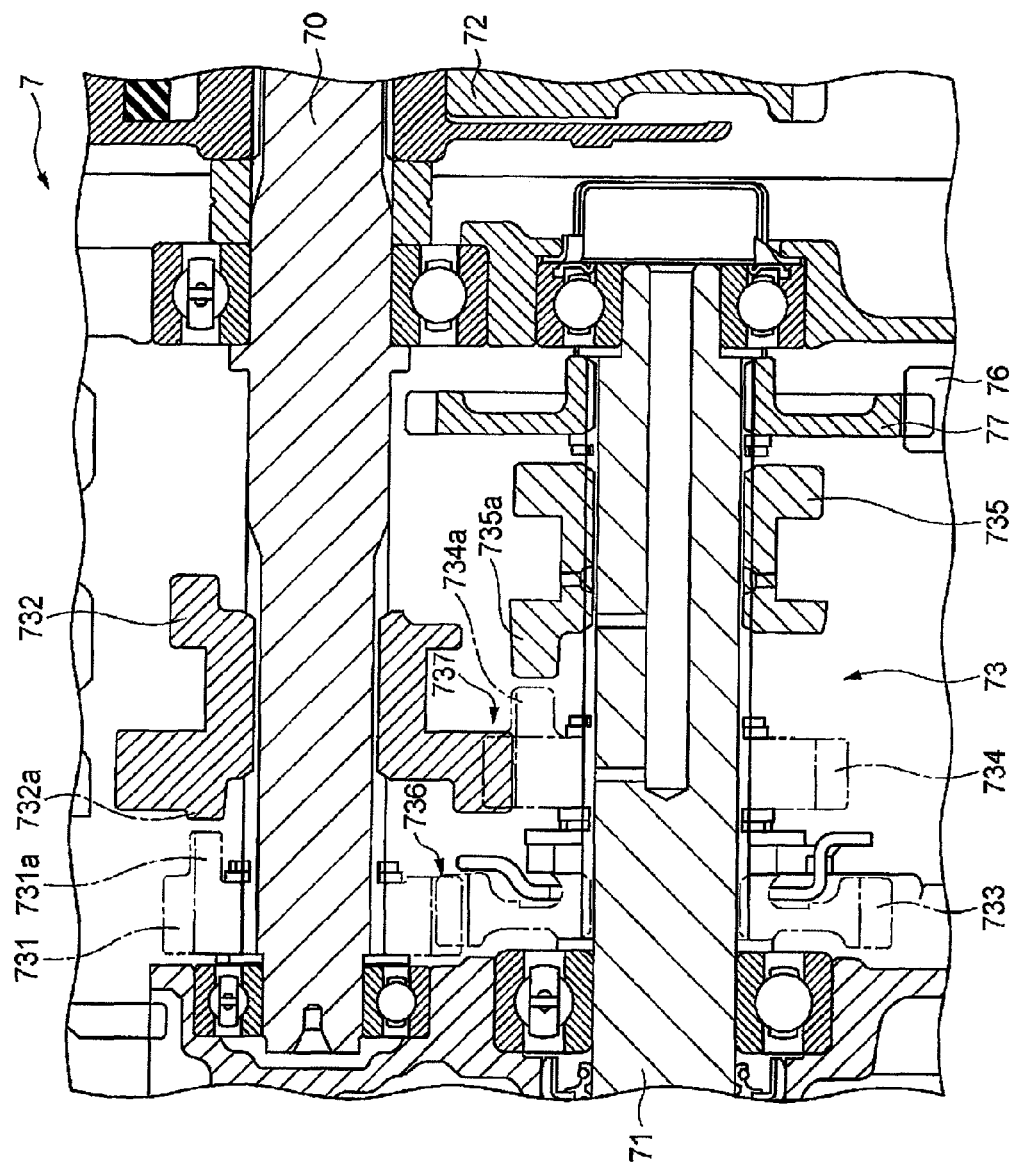
FIG. 7 is a sectional view, in neutral, of a variable speed portion of the power unit.

In neutral, as shown in FIG. 7, the high-speed drive-shifter gear 732 and the low-speed drive gear 731 do not engage with each other. Also, the shifter 735 and the high-speed driven gear 734 do not engage with each other. Even when the main shaft 70 rotates, therefore, transmission of power to the countershaft 71 through both the low-speed gear pair 736 and through the high-speed gear pair 737 is prevented.

Figure 8:
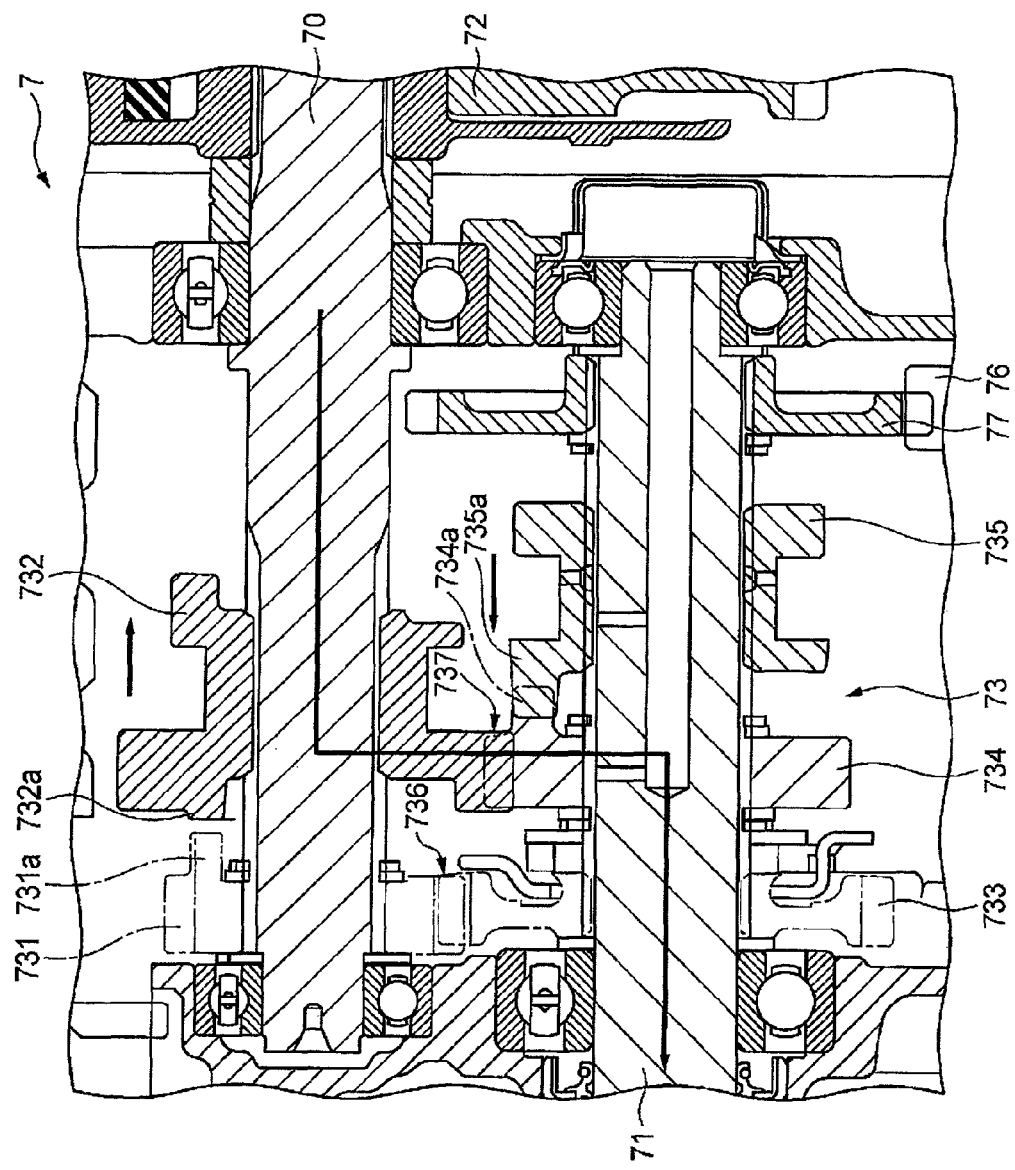
FIG. 8 is a sectional view, with a drive mode selected, of the variable speed portion of the power unit.

When the occupant swings the shift pedal to one side to select the drive mode from neutral, the shifter 735 slides to the high-speed driven gear 734 to engage an engagement portion 734a formed on the high-speed driven gear 734 and an engagement portion 735a formed on the shifter 735 with each other, as shown in FIG. 8. Thus, as shown by arrows in the drawing, power input into the main shaft 70 is transmitted from the high-speed drive-shifter gear 732 to the drive sprocket 74 of the countershaft 71 through the high-speed gear pair 737 and the shifter 735. On the other hand, when the occupant swings the shift pedal to the other side to shift back into neutral, the shifter 735 is returned to the neutral position to release the engagement between the engagement portion 734a and the engagement portion 735a.

Figure 9:
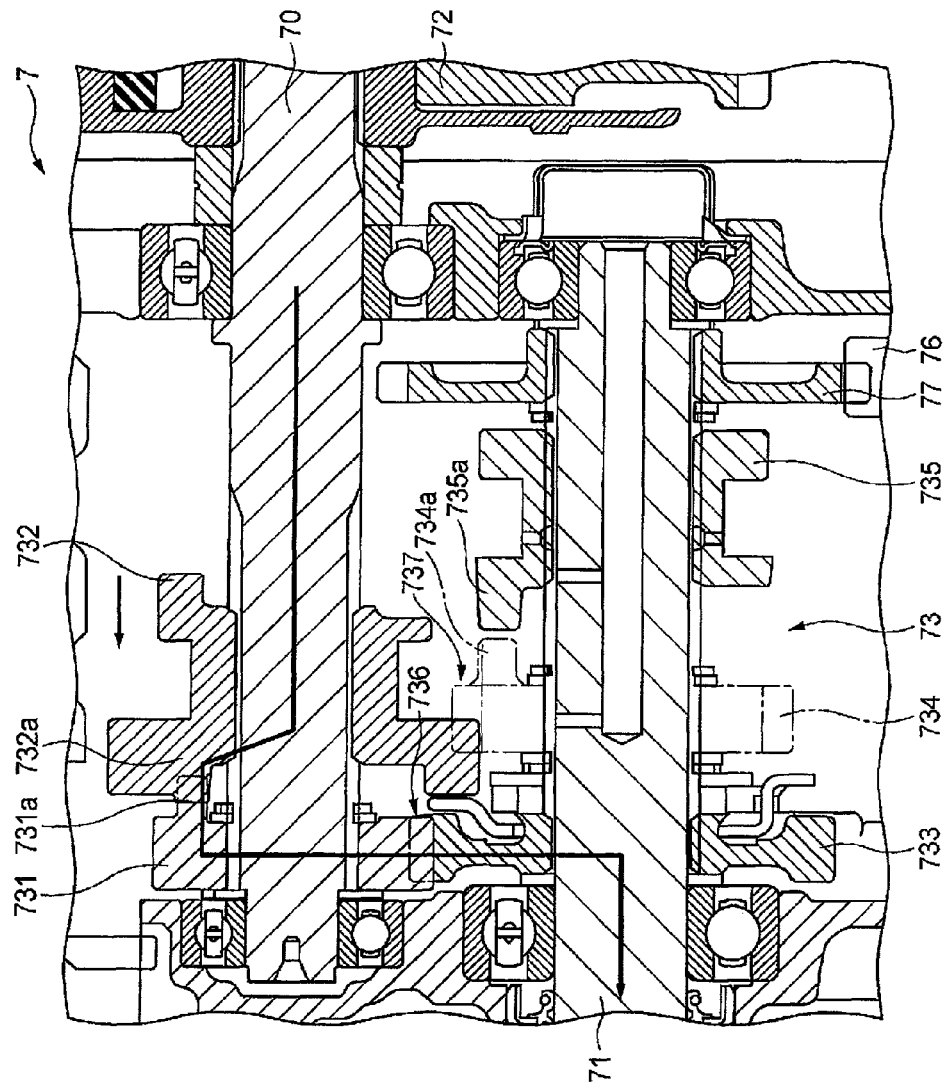
FIG. 9 is a sectional view, with a low-speed mode selected, of the variable speed portion of the power unit.

Meanwhile, when the occupant swings the shift pedal further to one side to select the low-speed mode from the drive mode, the shifter 735 is returned to the neutral position to release the engagement between the engagement portion 734a and the engagement portion 735a, and the high-speed drive-shifter gear 732 slides to the low-speed drive gear 731 to engage an engagement portion 731a formed on the low-speed drive gear 731 and an engagement portion 732a formed on the high-speed drive-shifter gear 732 with each other, as shown in FIG. 9. Thus, power input into the main shaft 70 is transmitted to the drive sprocket 74 of the countershaft 71 through the high-speed drive-shifter gear 732 and the low-speed gear pair 736. Also, when the occupant swings the shift pedal to one side or to the other side to select the drive mode from the low-speed mode or to shift back into neutral, the vehicle is put into the drive mode or neutral as described above.

According to the power unit P for the hybrid vehicle constructed in this manner, the motorcycle 1 can travel by transmitting power through the following two transmission paths, a first transmission path and a second transmission path.

[1] The first transmission path is a transmission path for a so-called engine running, in which power of the engine 5 is transmitted to the rear wheel WR through the crankshaft 50, the double centrifugal clutch 8, the outer circumferential shaft 46, the one-way clutch 47, the driven gear 59 (the primary drive gear 58), the primary driven gear 72, and the power transmission mechanism 7. In the first transmission path, two-speed change can be performed by the double centrifugal clutch 8 and the variable speed portion 73 of the power transmission mechanism 7. Also, during running while transmitting power through the first transmission path, assist running can be carried out by driving the motor 6 or alternatively, regenerative charge may be performed by using the motor 6 as a load.

[2] The second transmission path is a transmission path for a so-called EV running, in which power of the motor 6 is transmitted to the rear wheel WR through the motor output shaft 61, the motor drive gear 62, the driven gear 59 (the primary drive gear 58), the primary driven gear 72, the power transmission mechanism 7, and the drive chain 31. At this time, as described above, transmission of the power of the motor 6 to the crankshaft 50 is prevented by idling of the one-way clutch 47. Also, in the second transmission path, two-speed changes can be performed by the variable speed portion 73 of the power transmission mechanism 7.

Switching between the first transmission path and the second transmission path is automatically performed by the one-way clutch 47. On the basis of the rotational speed of the driven gear 59 provided on the outer diameter side of the one-way clutch 47 and the rotational speed of the outer circumferential shaft 46 provided on the inner diameter side of the one-way clutch 47, when the rotational speed of the outer circumferential shaft 46 is higher than that of the driven gear 59, the power is transmitted through the first transmission path. On the other hand, when the rotational speed of the driven gear 59 is higher than that of the outer circumferential shaft 46, the power is transmitted through the second transmission path.

In the power unit P constructed in this manner, as shown in FIG. 2, the motor 6 and the double centrifugal clutch 8 are disposed in a one-sided manner in the vehicle width direction with respect to the engine 5, and the vehicle center line O is located between the center of the piston 52 of the engine 5 and the motor 6.

Figure 11:
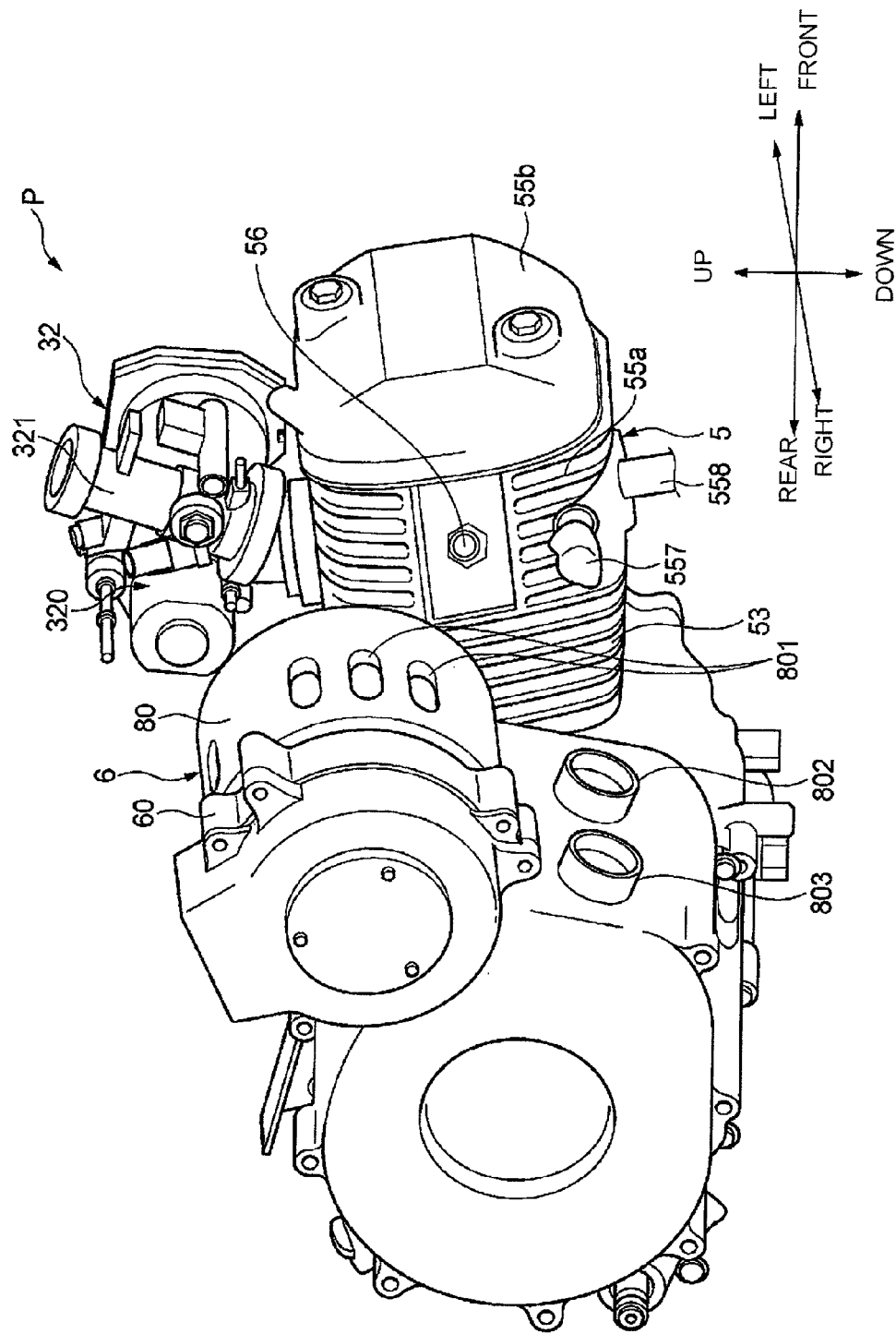
FIG. 11 is an external perspective view of the power unit.
Figure 12:
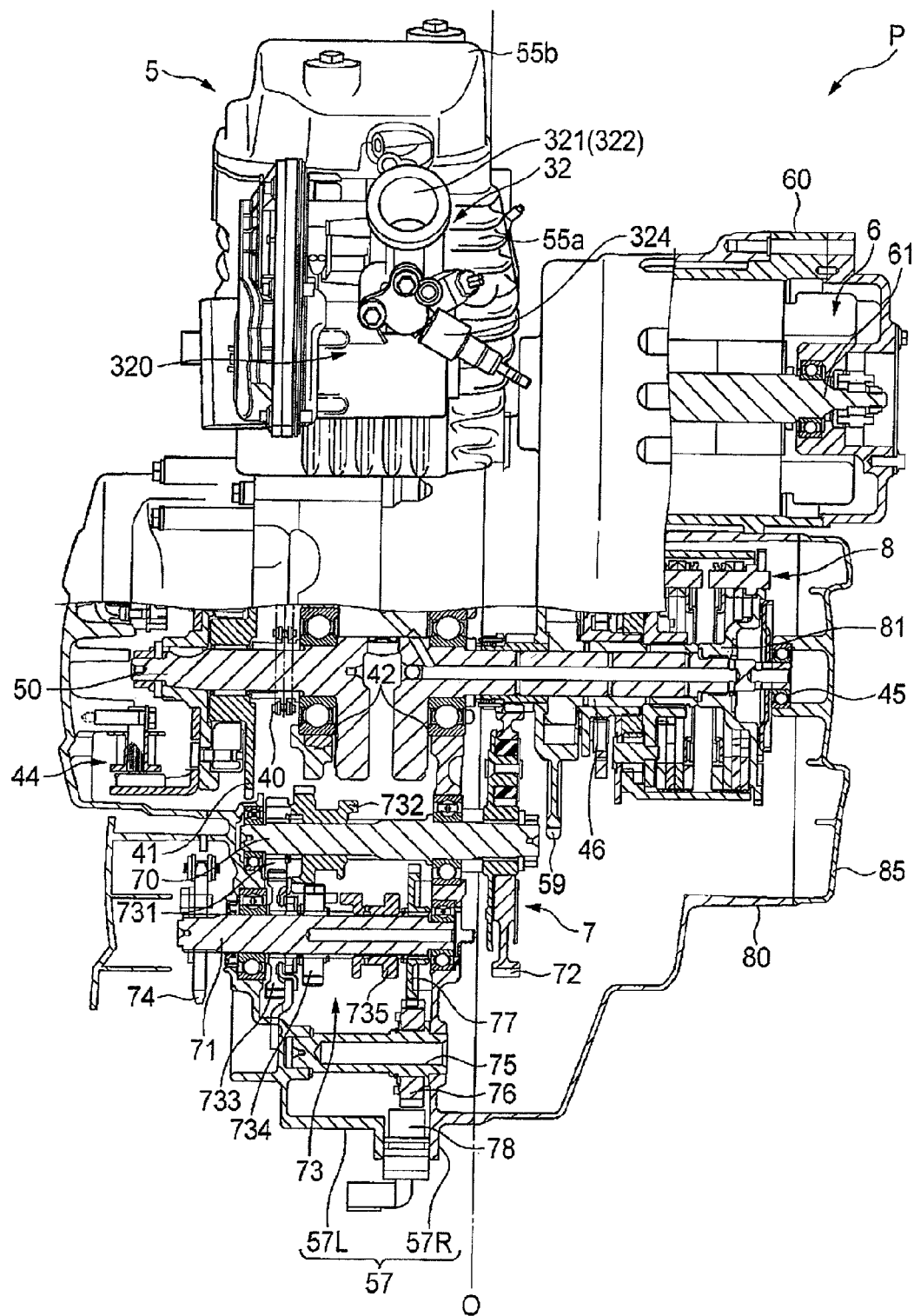
FIG. 12 is a partially sectional view of the power unit, illustrating the positional relationship between a throttle mechanism and a motor.

FIG. 10 is a side view with portions broken away of the power unit. FIG. 11 is a perspective view of the power unit. FIG. 12 is a partially sectional view of the power unit, illustrating the positional relationship between the throttle mechanism and the motor. In FIGS. 10 and 11, arrows show the directions in a state in which the power unit is mounted on the vehicle.

As shown in FIG. 10, the starter motor 33 is disposed above the crankcase 57 and in an overlapping manner with the motor 6 in a side view, and the throttle mechanism 32 is disposed above the cylinder 54 and in an overlapping manner with the motor 6 in a side view. Also, the motor 6 is disposed rearwardly of the intake passage 322 between the cylinder 54 and the main frame 22.

As shown in FIG. 11, on the crankcase cover 80 for covering the motor 6, there are provided a plurality of cooling openings 801 evenly spaced apart in a circumferential direction to cool the motor 6 accommodated therein. In FIG. 11, an opening 802 is provided for mounting a sensor for detecting rotational speed of a speed detector 835 (see FIG. 3) of the planetary carriers 834 of the planetary gear mechanism 83. An opening 803 is provided for mounting a sensor for detecting the rotational speed of a speed detector 815 (see FIG. 3) of the first clutch inner 81 of the double centrifugal clutch 8. In addition, an oxygen sensor 557 and an exhaust pipe 558 are provided.

Also, in the power unit P, as shown in FIG. 12, the actuator 320 of the throttle mechanism 32 is located opposite to the motor 6 in the width direction with respect to the vehicle center line O.

As described above, according to the hybrid vehicle of this embodiment, the engine 5 is suspended on the vehicle body in a non-swingable manner, with the cylinder 54 extending in a substantially horizontal direction and the crankshaft 50 provided to be oriented in the width direction. Also, the motor 6 is located in front of and above the crankshaft 50 of the engine 5. This prevents the motor 6 from interfering with the rear wheel WR, and the motor 6 can be disposed in the vicinity of the center of the vehicle body, thereby allowing a reduction of lateral expansion.

Furthermore, on one end of the crankshaft 50 of the engine 5, there is provided the double centrifugal clutch 8 for shifting power from the engine 5 to transmit the shifted power to the power transmission mechanism 7. Thus, power of the engine 5 can be previously shifted by the double centrifugal clutch 8 to be transmitted to the power transmission mechanism 7.

Also, the motor 6 and the double centrifugal clutch 8 are provided in a one-sided manner in the width direction with respect to the engine 5, thereby allowing effective utilization of a space lateral to the engine 5.

Moreover, the motor 6 is disposed lateral to the cylinder block 53 constituting the cylinder 54 and in an overlapping manner with the cylinder block 53 in side view. Therefore, it is possible to reduce the vertical length of the power unit and miniaturize the power unit.

Also, the power transmission mechanism 7 is provided with the variable speed portion 73 for shifting power from the engine 5 and the motor 6 to transmit the shifted power to the rear wheel WR. Thus, power of the engine 5 and the motor 6 can be shifted at a predetermined transmission gear ratio by the variable speed portion 73 and then transmitted to the rear wheel WR.

In addition, power of the engine 5 is input, by the double centrifugal clutch 8, into the primary drive gear 58 provided on the crankshaft 50 through the one-way clutch 47 to be transmitted from the primary drive gear 58 to the power transmission mechanism 7, thereby allowing travel of the vehicle using the power of the engine 5.

Moreover, the primary drive gear 58 is provided with the driven gear 59 to engage with the motor drive gear 62 of the motor 6. Also, power from the motor 6 is input into the driven gear 59 to be transmitted from the primary drive gear 58 to the power transmission mechanism 7, thereby allowing travel of the vehicle using power of the motor 6. In addition, by disengaging the one-way clutch 47, transmission of power of the motor 6 to the crankshaft 50 is prevented. Therefore, co-rotation of the engine 5 during the EV running is prevented, so that fuel economy can be increased.

Furthermore, the driven gear 59 and the motor case 60 overlap with each other in a side view. With this structure, power of the motor 6 can also be decelerated by engagement between the motor drive gear 62 and the driven gear 59 of the motor 6.

Also, the starter motor 33 is disposed above the crankcase 57 and in an overlapping manner with the motor 6 in side view, thereby allowing miniaturization of the power unit P.

Moreover, the throttle mechanism 32 using the throttle-by-wire system for operating the engine 5 is disposed above the cylinder 54 and in an overlapping manner with the motor 6 in side view, thereby allowing miniaturization of the power unit P.

Also, the actuator 320 of the throttle mechanism 32 is located opposite to the motor 6 in the width direction with respect to the vehicle center line O. Therefore, the expansion of the actuator 320 allows preventing interference with the motor 6.

In addition, the vehicle center line O is located between the center of the piston 52 of the engine 5 and the motor 6, thereby allowing a reduction with respect to the lateral expansion.

Also, the cooling openings 801 are provided on the crankcase cover 80 for covering the motor case 60, thereby suppressing heat generation of the motor 6.

In addition, the motor 6 is disposed rearwardly of the intake passage 322, between the cylinder 54 and the main frame 22, thereby allowing miniaturization of the power unit P.

It should be understood that the present invention is not limited to the above-described embodiment, and various changes, modifications or the like can be appropriately made.

Figure 13:
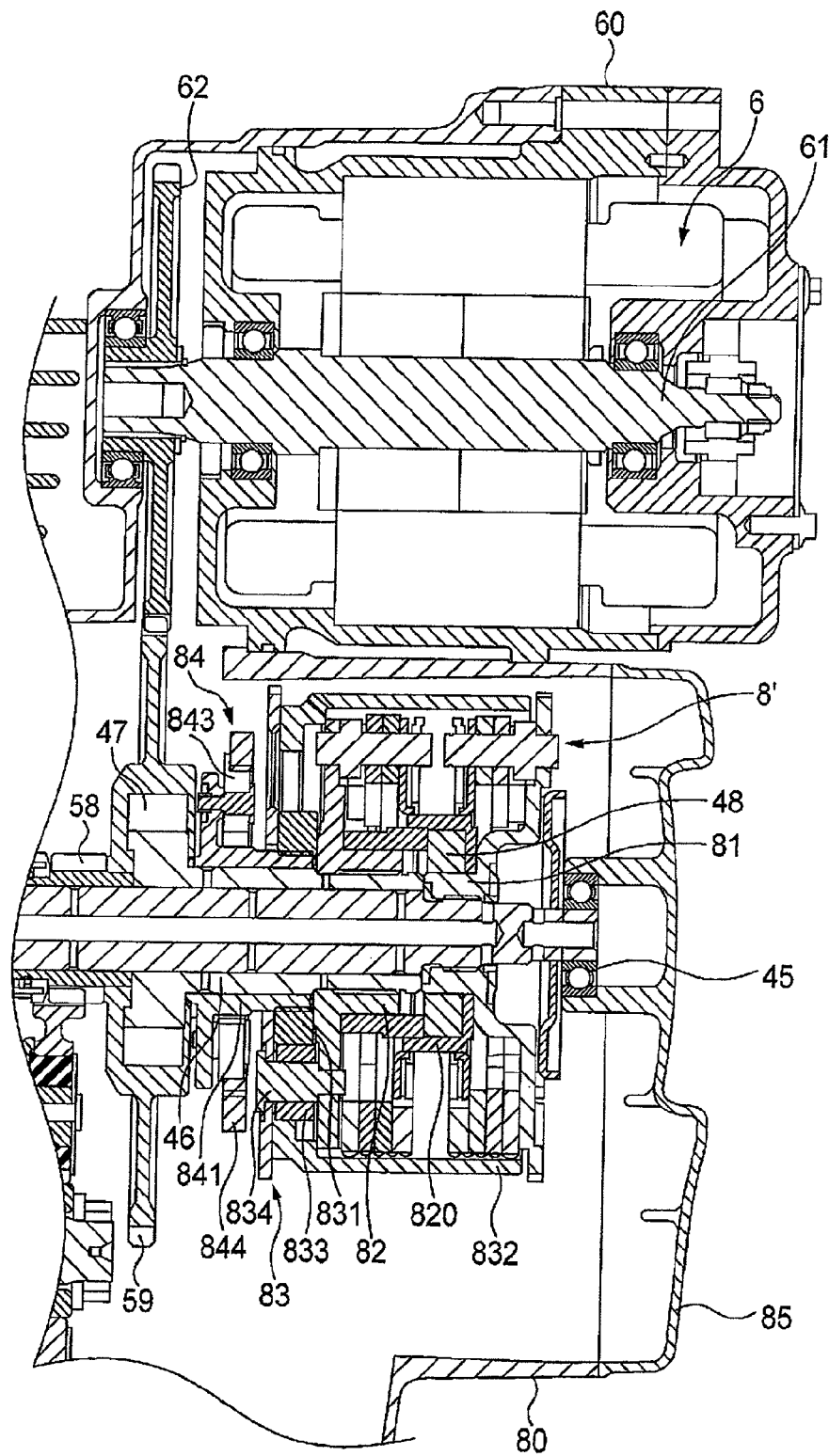
FIG. 13 is a sectional view of a modification of the variable speed mechanism.

FIG. 13 is a sectional view of a modification of the double centrifugal clutch serving as the variable speed mechanism. According to a double centrifugal clutch 8' of this modification, the first clutch inner 81 and the second clutch inner 82 are connected through a one-way clutch 48. The one-way clutch 48 is provided between a coupling member 820 attached to the second clutch inner 82 and the first clutch inner 81, and is set to prevent the second clutch inner 82 from rotating clockwise with respect to the first clutch inner 81 and allow the second clutch inner 82 to rotate counterclockwise. Thus, at the time of the engine running, the second clutch inner 82 is prevented from rotating at a higher speed than the first clutch inner 81. In other words, the second clutch inner 82 rotates counterclockwise with respect to the first clutch inner 81 and is prevented from rotating clockwise. Therefore, the one-way clutch 48 does not work.

On the other hand, at the time of the motor running, the driven gear 59 is connected to the outer circumferential shaft 46 through the one-way clutch 47, thereby preventing the power of the driven gear 59 from being transmitted to the outer circumferential shaft 46. However, in some circumstances, the one-way clutch 47 may follow the rotation of the driven gear 59. If this is the case, according to the double centrifugal clutch 8 of the foregoing embodiment, the sun gear 831 rotates clockwise through the planetary carriers 834 with the rotation of the outer circumferential shaft 46. When the sun gear 831 rotates clockwise, the ratchet supporting member 841 rotates clockwise and the ratchets 843 do not engage with the grooves 845 of the ratchet receiving portion 844, resulting in idling of the ratchet supporting member 841. At this time, the ratchets 843 make rotational noises.

According to this modification, at the time of the motor running, the first clutch inner 81 is in a non-operational state, which leads to clockwise rotation of the second clutch inner 82 with respect to the first clutch inner 81. Therefore, the one-way clutch 48 prevents the rotation of the second clutch inner 82, thereby reliably preventing the rotational noises of the ratchets 843 during the motor running and allowing minimization of energy losses caused by co-rotation of the outer circumferential shaft 46.

FIG. 14 is a sectional view of a modification of the ratchet receiving portion. A ratchet receiving portion 844' of this modification is constructed in such a manner that a second ratchet plate 844b provided with the grooves 845 on an inner peripheral surface thereof, leaving a predetermined space therebetween, is disposed on the inner periphery of a first ratchet plate 844a and the vibration-proof rubbers 846 are molded so as to cover over the second ratchet plate 844b. The rotation of the first ratchet plate 844a relative to the vibration-proof rubbers 846 is prevented by recesses 847 provided on the first ratchet plate 844a. In this manner, since the inner peripheral surface of the second ratchet plate 844b including the grooves 845 is entirely covered with the vibration-proof rubbers 846, the rotational noises of the ratchets 843 can be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hybrid vehicle comprising:
an internal combustion engine providing a first drive source for powering the hybrid vehicle in an engine running mode;
an electric motor providing a second drive source for powering the hybrid vehicle in an electric vehicle (EV) running mode; and
a power transmission mechanism for transmitting power of the internal combustion engine and the electric motor to a driven portion;
wherein the internal combustion engine is suspended on a vehicle body in a non-swingable manner, with a cylinder extending in a substantially horizontal direction and a crankshaft provided to be oriented in a vehicle width direction; and
the electric motor is located in front of and above the crankshaft of the internal combustion engine.

2. The hybrid vehicle according to claim 1, wherein, on one end of the crankshaft of the internal combustion engine, there is provided a variable speed mechanism for shifting power from the internal combustion engine to transmit the shifted power to the power transmission mechanism.

3. The hybrid vehicle according to claim 2, wherein the electric motor and the variable speed mechanism are provided in a one-sided manner in the vehicle width direction with respect to the internal combustion engine.

4. The hybrid vehicle according to claim 2, wherein power of the internal combustion engine is input, by the variable speed mechanism, into a primary drive gear provided on the crankshaft through a first one-way clutch to be transmitted from the primary drive gear to the power transmission mechanism.

5. The hybrid vehicle according to claim 4, wherein the primary drive gear is provided with a driven gear to engage with a motor drive gear of the electric motor; and
power from the electric motor is input into the driven gear to be transmitted from the primary drive gear to the power transmission mechanism.

6. The hybrid vehicle according to claim 5, wherein the driven gear and a motor case overlap with each other in a side view.

7. The hybrid vehicle according to claim 5, wherein the variable speed mechanism is a double centrifugal clutch provided on the crankshaft;
wherein a first-stage centrifugal clutch is configured in such a manner that, when rotational speed of a first clutch inner reaches a first predetermined rotational speed, the first clutch inner is connected to a clutch outer, the clutch outer forming a ring gear of a planetary gear mechanism provided on the crankshaft; planetary gears engaging with the ring gear engage with a sun gear rotatable in one direction and prevented from rotating in the other direction; and connection of the first clutch inner to the clutch outer results in power transmission to the planetary gears to allow the sun gear to rotate in the other direction, so that rotation of the clutch outer is decelerated through carriers for supporting the planetary gears to be transmitted to the power transmission mechanism; and
wherein a second-stage centrifugal clutch is configured in such a manner that, when rotational speed of a second clutch inner rotated integrally with the carriers reaches a second predetermined rotational speed, the second clutch inner is connected to the clutch outer; and connection of the second clutch inner to the clutch outer allows the ring gear, the carriers, and the sun gear to rotate integrally in one direction, so that rotation of the clutch outer is transmitted to the power transmission mechanism, without decelerating through the planetary gear mechanism.

8. The hybrid vehicle according to claim 7, wherein the carriers are supported by an outer circumferential cylinder provided on an outer circumference of the crankshaft in such a manner so as to be rotatable relative to the crankshaft, the outer circumferential cylinder being connected to the primary drive gear through the first one-way clutch; and the first clutch inner and the second clutch inner are connected through a second one-way clutch, the second one-way clutch being provided to prevent the second clutch inner from rotating in one direction with respect to the first clutch inner and allowing the second clutch inner to rotate in the other direction.

9. The hybrid vehicle according to claim 1, wherein the electric motor is disposed lateral to a cylinder block constituting the cylinder and in an overlapping manner with the cylinder block in side view.

10. The hybrid vehicle according to claim 1, wherein the driven portion is a rear wheel of the hybrid vehicle, and
the power transmission mechanism is provided with a variable speed portion for shifting power between the internal combustion engine and the electric motor in order to transmit the shifted power of the internal combustion engine to the rear wheel when the hybrid vehicle is in the engine running mode, and to transmit the shifted power of the electric motor to the rear wheel when the hybrid vehicle is in the electric vehicle (EV) running mode.

11. The hybrid vehicle according to claim 1, and further comprising a starter motor for starting the internal combustion engine,
wherein the starter motor is disposed above the crankcase and in an overlapping manner with the electric motor in side view.

12. The hybrid vehicle according to claim 1, and further comprising a throttle mechanism using a throttle-by-wire system for operating the internal combustion engine,
wherein the throttle mechanism is disposed above the cylinder and in an overlapping manner with the electric motor in side view.

13. The hybrid vehicle according to claim 12, wherein an actuator of the throttle mechanism is located opposite to the electric motor in the width direction with respect to a vehicle center line.

14. The hybrid vehicle according to claim 1, wherein a vehicle center line is located between a center of a piston of the internal combustion engine, and the electric motor.

15. The hybrid vehicle according to claim 1, wherein a cover member for covering the electric motor is provided with a cooling opening for cooling the electric motor.

16. The hybrid vehicle according to claim 1, wherein a power unit composed of the internal combustion engine, the electric motor, and the power transmission mechanism, is suspended by a main frame extending rearward and downward from a head pipe;
an air cleaner is fixed to the main frame;
the air cleaner is connected to an engine through an intake passage extending above and in front of the engine;
a leg shield is provided on either side of a head portion of the cylinder; and
the electric motor is disposed rearwardly of the intake passage, between the cylinder and the main frame.

17. A hybrid vehicle comprising:
a vehicle body;
an internal combustion engine operatively mounted on the vehicle body and providing a first drive source for powering the hybrid vehicle in an engine running mode;
an electric motor operatively mounted on the vehicle body and providing a second drive source for powering the hybrid vehicle in an electric vehicle (EV) running mode;
a power transmission mechanism operatively mounted on the vehicle body and being operatively connected to the internal combustion engine and the electric motor for transmitting power of the internal combustion engine and the electric motor to a driven portion;
said internal combustion engine being suspended on the vehicle body in a non-swingable manner, with a cylinder extending in a substantially horizontal direction and a crankshaft provided to be oriented in a vehicle width direction; and
said electric motor is operatively mounted in front of and above the crankshaft of the internal combustion engine.

18. The hybrid vehicle according to claim 17, said crankshaft of the internal combustion engine having a first end with a variable speed mechanism operatively mounted on the first end for shifting power from the internal combustion engine to transmit the shifted power to the power transmission mechanism.

19. The hybrid vehicle according to claim 18, wherein the electric motor and the variable speed mechanism are provided in a one-sided manner in the vehicle width direction with respect to the internal combustion engine.

20. The hybrid vehicle according to claim 17, wherein the electric motor is disposed lateral to a cylinder block constituting the cylinder and in an overlapping manner with the cylinder block in side view.

* * * * *